US012604309B2

(12) United States Patent
Xu et al.

(10) Patent No.: US 12,604,309 B2
(45) Date of Patent: Apr. 14, 2026

(54) REPETITION OF XR INFORMATION

(71) Applicant: Qualcomm Incorporated, San Diego, CA (US)

(72) Inventors: Huilin Xu, Temecula, CA (US); Nicolas Cornillet, Lannion (FR); Jay Kumar Sundararajan, San Diego, CA (US); Yuchul Kim, San Diego, CA (US); Wilfred Ilamthy Dore, Gennevilliers (FR); Linhai He, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 17/812,988

(22) Filed: Jul. 15, 2022

(65) Prior Publication Data

US 2024/0023088 A1      Jan. 18, 2024

(51) Int. Cl.
*H04W 72/1268* (2023.01)
*H04L 1/08* (2006.01)
*H04W 72/23* (2023.01)

(52) U.S. Cl.
CPC ........... *H04W 72/1268* (2013.01); *H04L 1/08* (2013.01); *H04W 72/23* (2023.01)

(58) Field of Classification Search
None
See application file for complete search history.

(56) References Cited

U.S. PATENT DOCUMENTS

2013/0283037 A1*  10/2013  Katz ..................... H04L 65/762
                                                          713/150
2022/0303988 A1*   9/2022  Yi ........................... H04L 1/189
2024/0089959 A1*   3/2024  Ma ...................... H04W 72/232
2024/0215036 A1*   6/2024  Chen .................... H04W 72/21
2024/0259871 A1*   8/2024  Wang .................. H04W 72/231
                            (Continued)

OTHER PUBLICATIONS

China Telecom: "Discussion on XR Enhancement for NR", R1-2203666, 3GPP TSG RAN WG1 Meeting #109-e, 3rd Generation Partnership Project, Mobile Competence Centre, 650, Route Des Lucioles, F-06921 Sophia-Antipolis Cedex, France, vol. RAN WG1, No. E-Meeting, May 9, 2022-May 20, 20220, Apr. 29, 2022, XP052153106, 5 Pages, p. 4.

(Continued)

*Primary Examiner* — Saad Khawar
(74) *Attorney, Agent, or Firm* — Paul M. McAdams; Procopio, Cory, Hargreaves & Savitch LLP

(57) ABSTRACT
Apparatus, methods, and computer program products for repetition of XR information are provided. An example method may include receiving XR data associated with an XR application from a network entity. The example method may further include transmitting, for the network entity at a first time, a first transmission including a first instance of XR information and a second instance of XR information. The example method may further include transmitting, for the network entity at a second time, a second transmission including the second instance of XR information and a third instance of XR information, where a time difference between the first time and the second time may be based on a periodicity associated with the XR information.

32 Claims, 10 Drawing Sheets

(56) References Cited

U.S. PATENT DOCUMENTS

2024/0357616 A1* 10/2024 Singh .................... H04L 1/1896

OTHER PUBLICATIONS

Intel: "Rel-18 NR XR", RP-212339, 3GPP TSG RAN Meeting#93e, 3rd Generation Partnership Project, Mobile Competence Centre, 650, Route Des Lucioles, F-06921 Sophia-Antipolis Cedex, France, No. Electronic Meeting, Sep. 13, 2021-Sep. 17, 2021, Sep. 6, 2021, XP052049598, pp. 1-7, p. 2.

International Search Report and Written Opinion—PCT/US2023/026257—ISA/EPO—Sep. 25, 2023.

Mediatek Inc: "Evaluation and Enhancements of Configured-Grant for URLLC", R1-1901827, 3GPP TSG RAN WG1 Meeting #96, 3rd Generation Partnership Project, Mobile Competence Centre, 650, Route Des Lucioles, F-06921, Sophia-Antipol, vol. RAN WG1, No. Athens, Greece, Feb. 25, 2019-Mar. 1, 2019, Feb. 16, 2019, XP051599520, 9 Pages, figure 3.

Nokia., et al., "Discussion on XR-Specific Capacity Enhancements", R1-2204675, 3GPP TSG RAN WG1 #109-e, 3rd Generation Partnership Project, Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, XP052203801, 15 Pages, paragraph [03.2].

Qualcomm Incorporated: "Power Saving Techniques for XR", 3GPP TSG RAN WG1 #109-e, R1-2205176, 3rd Generation Partnership Project (3GPP), Mobile Competence Centre, 650, Route Des Lucioles, F-06921 Sophia- Antipolis Cedex, vol. RAN WG1, No. e-Meeting, May 9, 2022-May 20, 2022, May 9, 2022 , XP052191816, pp. 1-29, paragraph [03.2].

ZTE., et al., "Discussion on XR Specific Capacity Enhancements Techniques", R1-2203607, 3GPP TSG RAN WG1 #109-e, 3rd Generation Partnership Project, Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, XP052153072, pp. 1-16, paragraph [2.2.1].

* cited by examiner

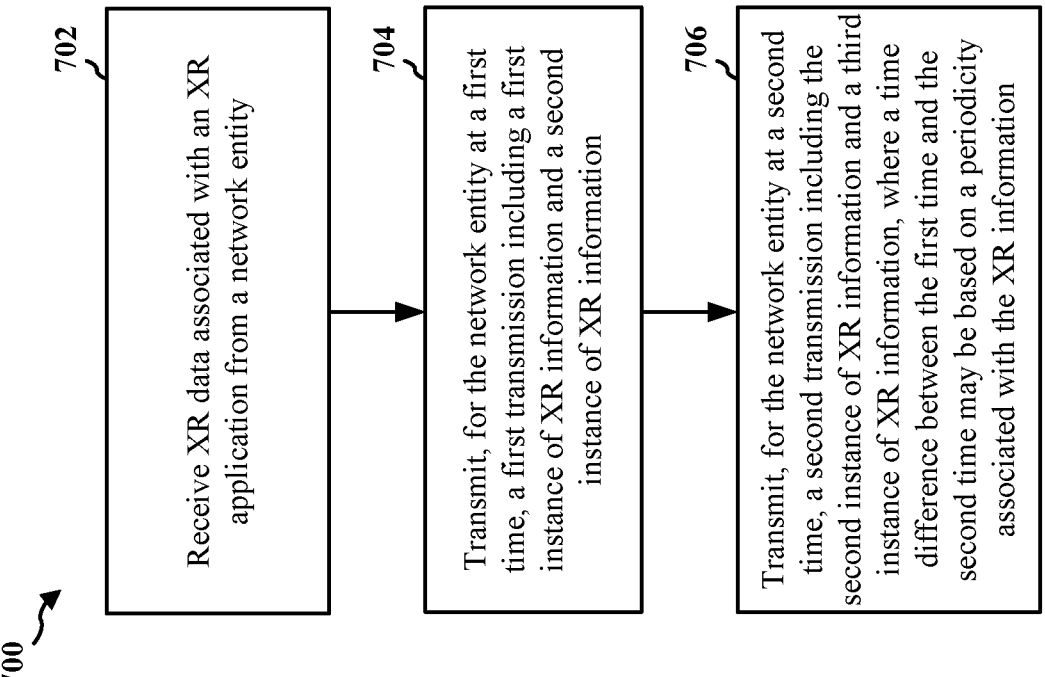

702

Receive XR data associated with an XR application from a network entity

704

Transmit, for the network entity at a first time, a first transmission including a first instance of XR information and a second instance of XR information

706

Transmit, for the network entity at a second time, a second transmission including the second instance of XR information and a third instance of XR information, where a time difference between the first time and the second time may be based on a periodicity associated with the XR information

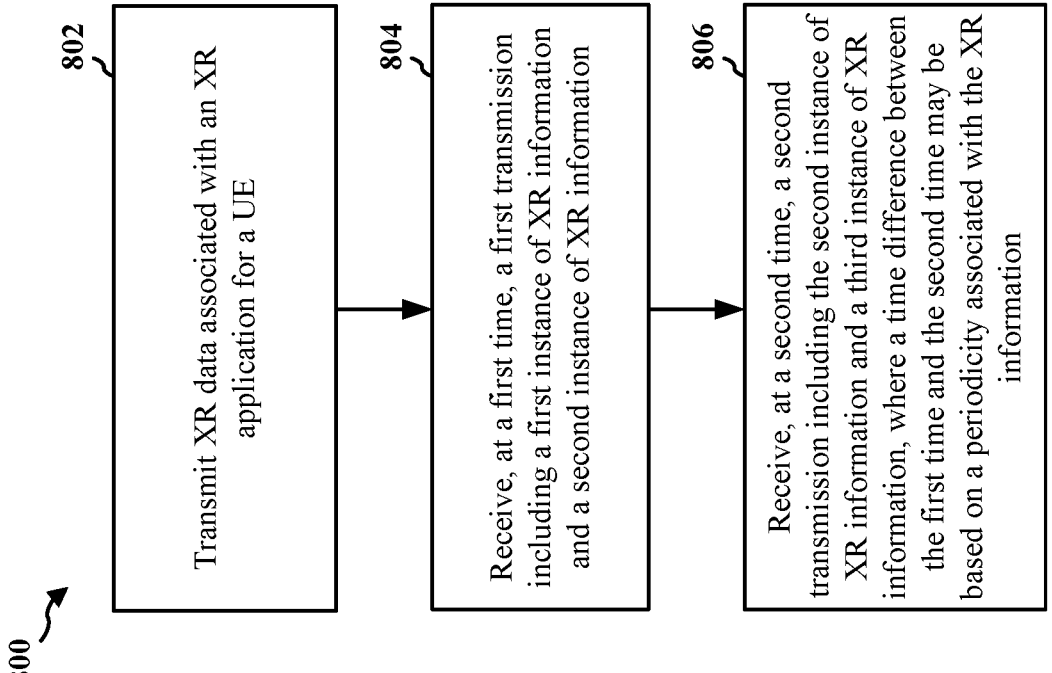

802

Transmit XR data associated with an XR application for a UE

804

Receive, at a first time, a first transmission including a first instance of XR information and a second instance of XR information

806

Receive, at a second time, a second transmission including the second instance of XR information and a third instance of XR information, where a time difference between the first time and the second time may be based on a periodicity associated with the XR information

REPETITION OF XR INFORMATION

TECHNICAL FIELD

The present disclosure relates generally to communication systems, and more particularly, to wireless communication systems with extended reality (XR) information.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive extended reality (XR) data associated with an XR application from a network entity. The memory and the at least one processor coupled to the memory may be further configured to transmit, for the network entity at a first time, a first transmission including a first instance of XR information and a second instance of XR information. The memory and the at least one processor coupled to the memory may be further configured to transmit, for the network entity at a second time, a second transmission including the second instance of XR information and a third instance of XR information, where a time difference between the first time and the second time may be based on a periodicity associated with the XR information.

In another aspect of the disclosure, a method, a computer-readable medium, and an apparatus at a network entity are provided. The apparatus may include a memory and at least one processor coupled to the memory. The memory and the at least one processor coupled to the memory may be configured to transmit XR data associated with an XR application for a UE. The memory and the at least one processor coupled to the memory may be further configured to receive, at a first time, a first transmission including a first instance of XR information and a second instance of XR information. The memory and the at least one processor coupled to the memory may be further configured to receive, at a second time, a second transmission including the second instance of XR information and a third instance of XR information, where a time difference between the first time and the second time may be based on a periodicity associated with the XR information.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a flowchart of a method of wireless communication.

FIG. 8 is a flowchart of a method of wireless communication.

DETAILED DESCRIPTION

Figure 1:
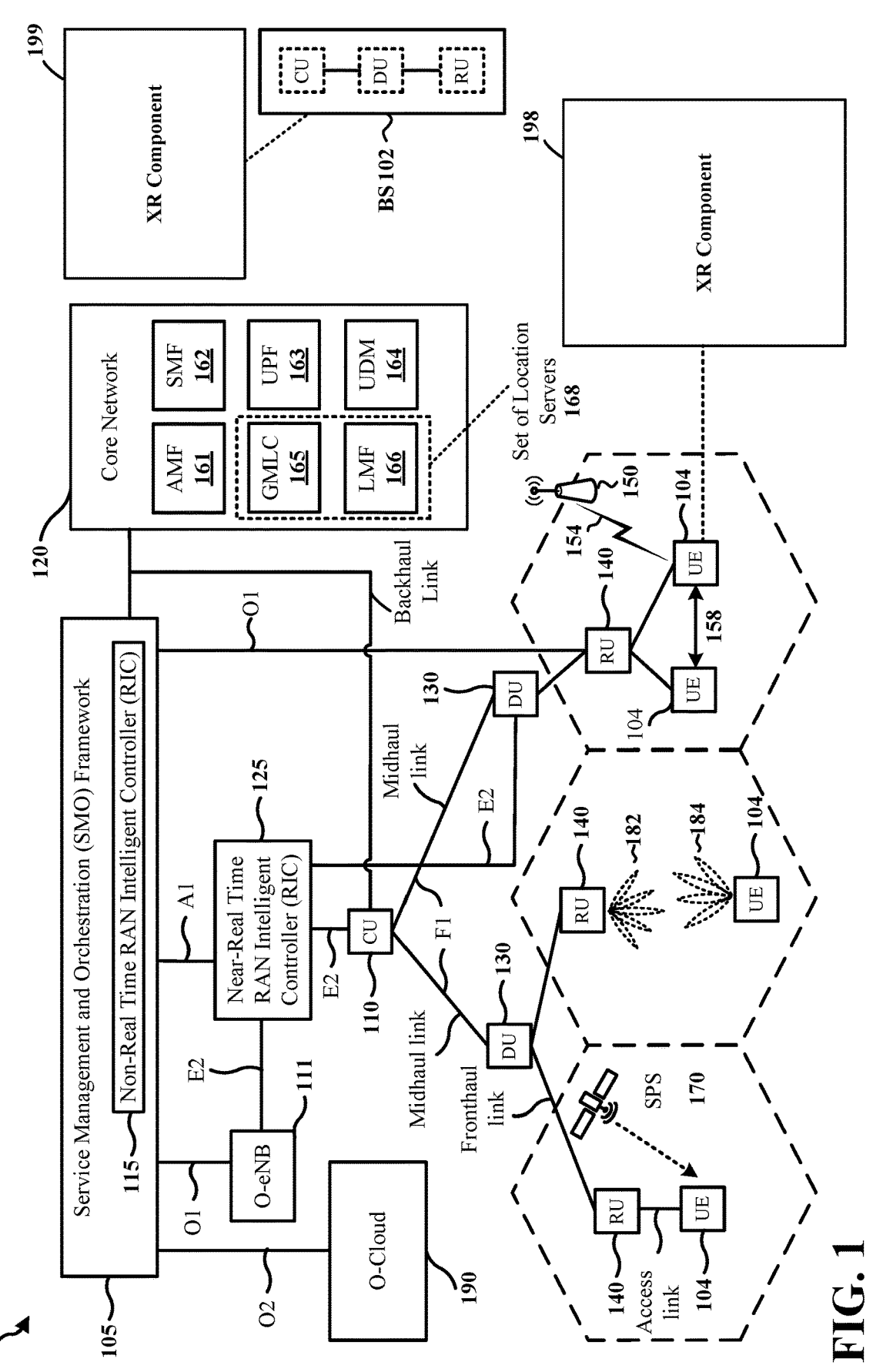
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a XR component 198. In some aspects, the XR component 198 may be configured to receive XR data associated with an XR application from a network entity. In some aspects, the XR component 198 may be further configured to transmit, for the network entity at a first time, a first transmission including a first instance of XR information and a second instance of XR information. In some aspects, the XR component 198 may be further configured to transmit, for the network entity at a second time, a second transmission including the second instance of XR information and a third instance of XR information, where a time difference between the first time and the second time may be based on a periodicity associated with the XR information.

In certain aspects, the base station 102 may include a XR component 199. In some aspects, the XR component 199 may be configured to transmit XR data associated with an XR application for a UE. In some aspects, the XR component 199 may be further configured to receive, at a first time, a first transmission including a first instance of XR information and a second instance of XR information. In some aspects, the XR component 199 may be further configured to receive, at a second time, a second transmission including the second instance of XR information and a third instance of XR information, where a time difference between the first time and the second time may be based on a periodicity associated with the XR information.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
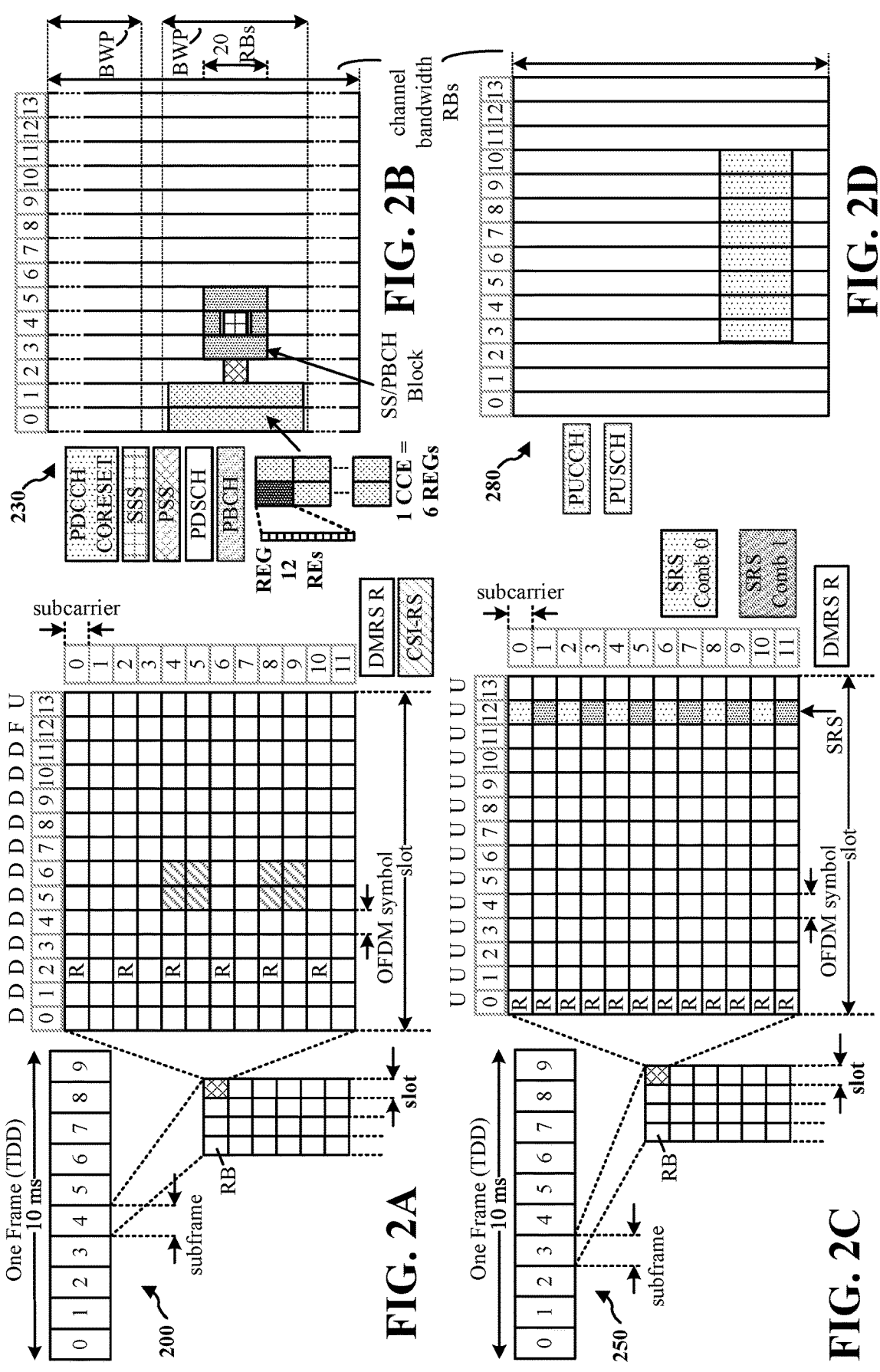
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
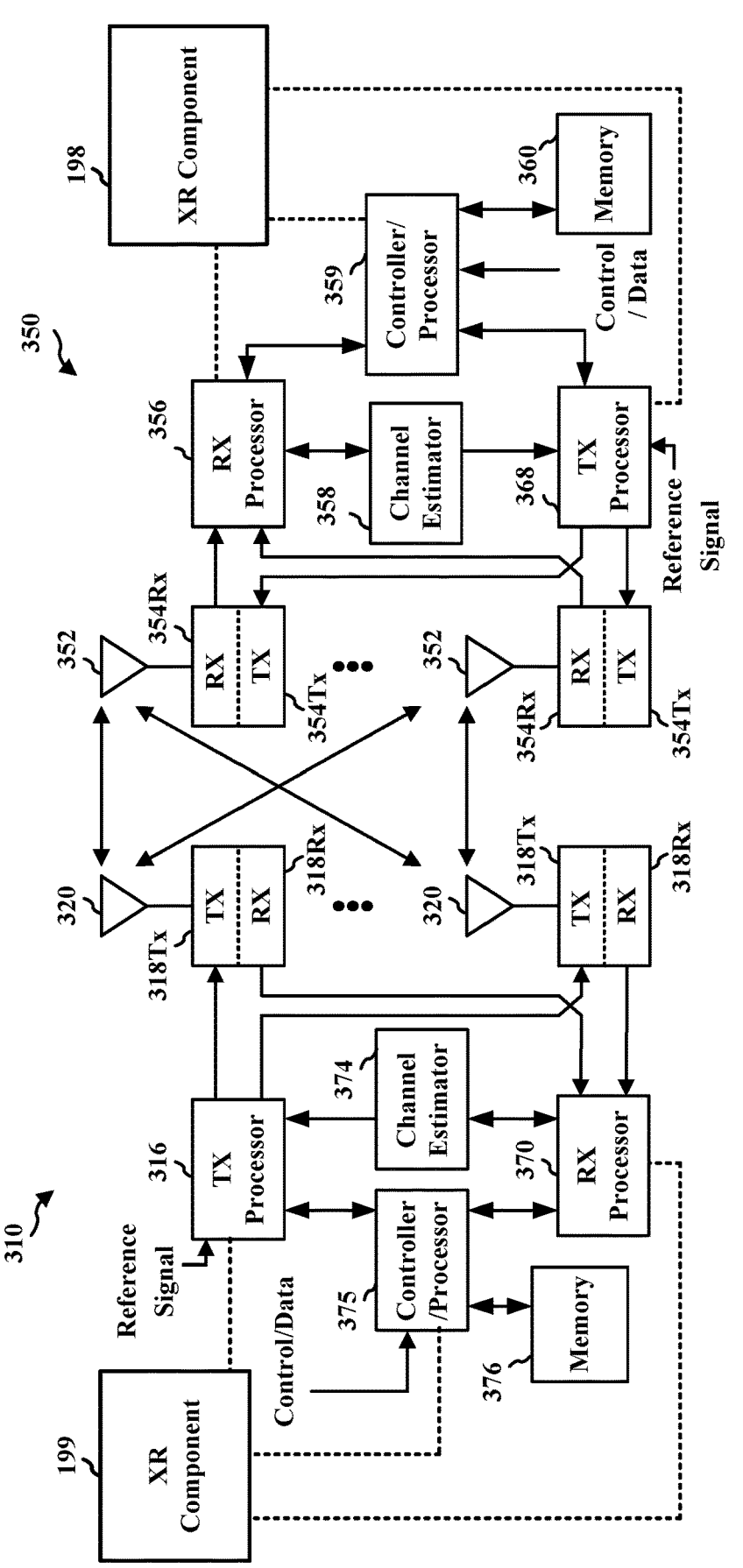
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with XR component 198 of FIG. 1.

At least one of the TX processor 316, the RX processor 370, and the controller/processor 375 may be configured to perform aspects in connection with XR component 199 of FIG. 1.

Extended reality (XR) may refer to all real-and-virtual combined environments and human-machine interactions generated by computer technology and wearables such as augmented reality (AR), virtual reality (VR), or mixed reality (MR). Wireless communication systems may support transmission of XR traffic, such as traffic associated with visual or audio information from the network to a UE or traffic associated with control and pose information from the UE to a network. As an example, XR traffic may be semi-periodic, high throughput, and with tight latency budget. For example, in the DL, the network may transmit video/audio data to UE in frames, e.g., 60 frames per second. In the UL, the UE may transmit pose and control information to network based on a periodicity, e.g., once every 4 ms. For some XR applications such as AR, the UE may also transmit video data to network. As used herein, the term "XR data" may refer to any data, such as video/audio data, pose data, or control data associated with an XR application. As used herein, the term "XR information" may refer to information related to an XR application, such as video/audio information, pose information, or control information associated with an XR application. Pose information may be information for indicating a field of view. Pose information may be useful for minimizing the total data traffic because the network may transmit video data in the field of view without transmitting video data outside the field of view. In some aspects, the pose information may be six degrees of freedom (6DOF) pose information in the position (x, y, z) and rotation (roll, yaw, pitch) dimensions. Periodic transmission of pose information from the UE to the network may be used for facilitating accurate estimation and tracking of the field of view at the network end. As used herein, the terms "control and pose information" and "pose and control information" may refer to control information or pose information.

As an example, the pose and control information may be characterized by high frequency of occurrences (e.g., 4 ms periodicity), tight packet delay budget (e.g., high decoding performance specification (e.g., 99% success rate). Example parameters for transmitting pose and control information is provided below:

TABLE 2

| Parameters | unit | Example values |
|---|---|---|
| Periodicity | Millisecond (ms) | 4 |
| Jitter | ms | No jitter |
| Packet size | byte | 100 |
| Packet delay budget (PDB) | ms | 10 |
| Minimum Packet Success Rate X | % | 99 |

To achieve the low packet error rate (which may be 100% minus the minimum packet success rate) (e.g., 1%) for such a small size (e.g., 100 byte) packet, repetition may be applied for XR pose and control information.

Figures 4A, 4B:
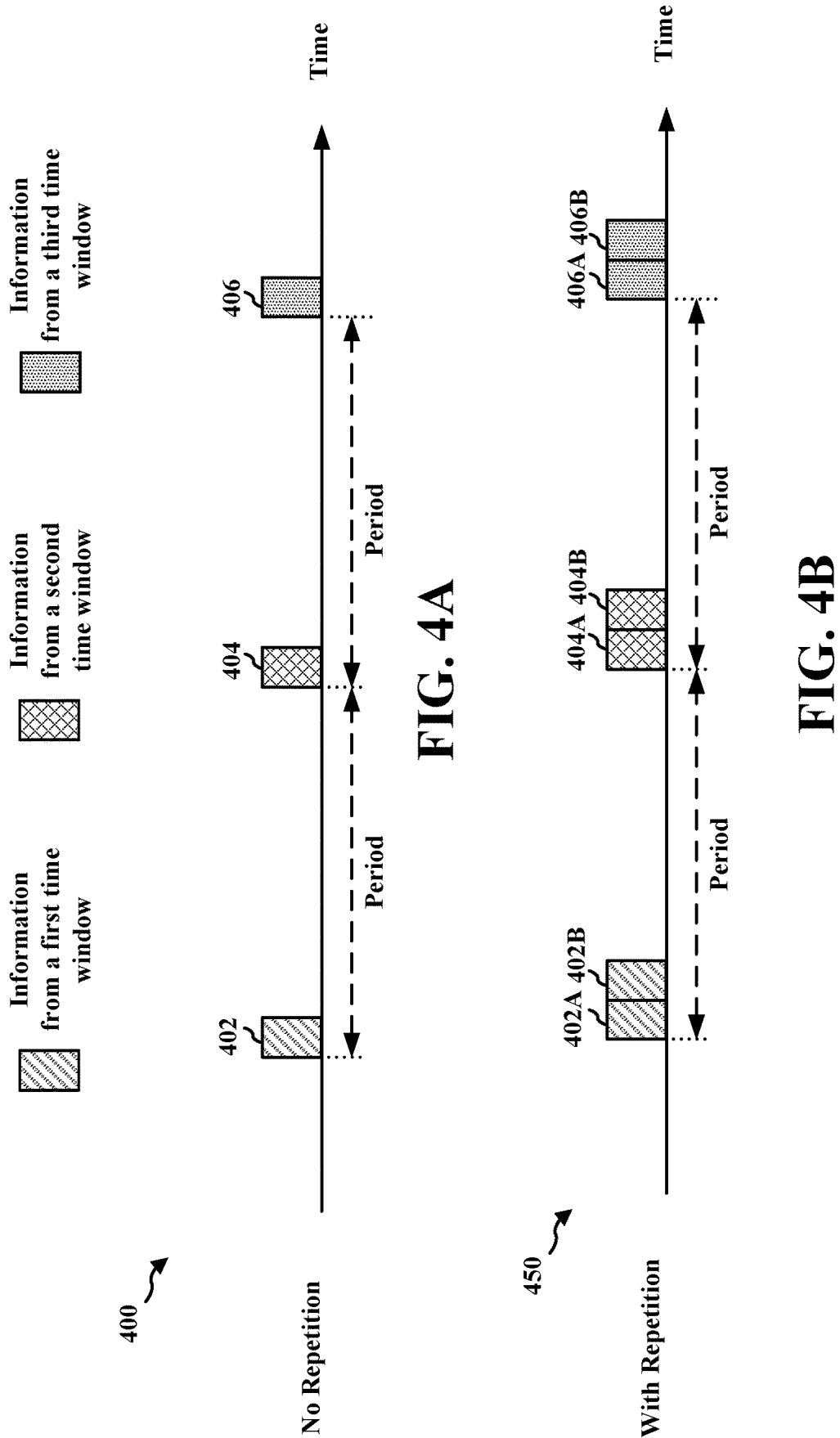
FIG. 4A is a diagram illustrating example transmissions with no repetitions.
FIG. 4B is a diagram illustrating example transmissions with repetitions.

FIG. 4A is a diagram 400 illustrating example transmissions with no repetitions. As illustrated in FIG. 4A, UL XR control and pose information in a first time window (e.g., a number of milliseconds before the transmission) may be transmitted in a first packet 402, UL XR control and pose information in a second time window (e.g., a number of milliseconds before the transmission) may be transmitted in a second packet 404, and UL XR control and pose information in a third time window (e.g., a number of milliseconds before the transmission) may be transmitted in third packet 406. No repetition may be applied in the example illustrated in FIG. 4A.

FIG. 4B is a diagram 450 illustrating example transmissions with repetitions. As illustrated in FIG. 4B, UL XR control and pose information in a first time window (e.g., a number of milliseconds before the transmission) may be transmitted in a first packet 402A and a repetition 402B of the first packet, UL XR control and pose information in a second time window (e.g., a number of milliseconds before the transmission) may be transmitted in a second packet 404A and a repetition 404B of the second packet, and UL XR control and pose information in a third time window (e.g., a number of milliseconds before the transmission) may be transmitted in third packet 406A and a repetition 406B of the third packet. Repetition may be applied in the example illustrated in FIG. 4B to facilitate more robust (e.g., with lower error rate and higher success rate) transmission of XR pose and control information.

Figures 5A, 5B:
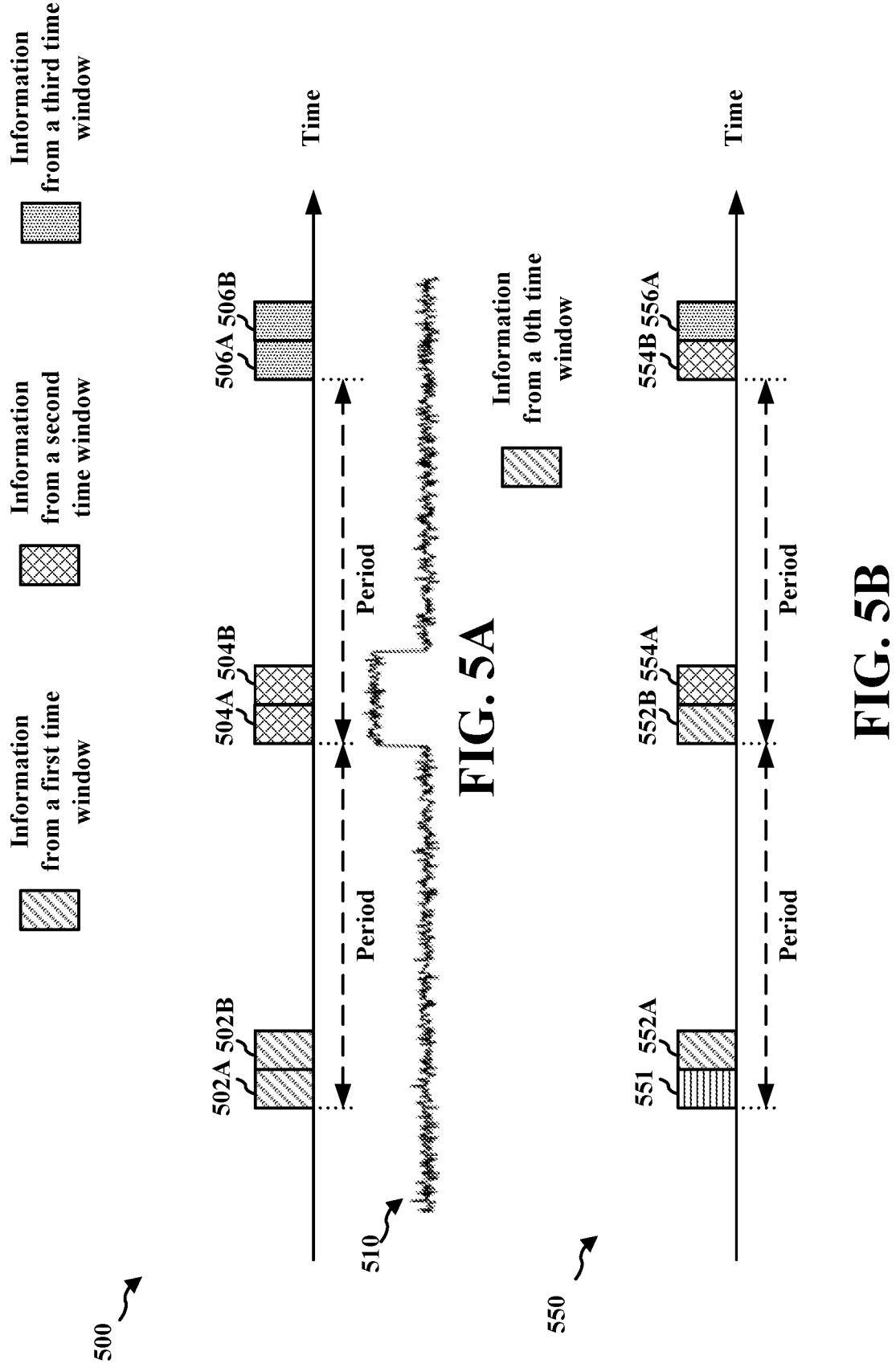
FIG. 5A is a diagram illustrating example transmissions with repetitions and affected by burst interference.
FIG. 5B is a diagram illustrating example transmissions with staggered repetitions.

Such a repetition mechanism illustrated in FIG. 4B may be vulnerable to burst interference. FIG. 5A is a diagram 500 illustrating example transmissions with repetitions and affected by burst interference. As illustrated in FIG. 5A, UL XR control and pose information in a first time window may be transmitted in a first packet 502A and a repetition 502B of the first packet, UL XR control and pose information in a second time window may be transmitted in a second packet 504A and a repetition 504B of the second packet, and UL XR control and pose information in a second time window may be transmitted in third packet 506A and a repetition 506B of the third packet. An interference 510 with a burst interference may affect transmission of the UL XR control and pose information in the second time window transmitted in the second packet 504A and the repetition 504B of the second packet. Aspects provided herein may enable more robust transmission of UL pose and control information based on sliding window-based repetition (or staggered repetition). FIG. is a diagram 550 illustrating example transmissions with staggered repetitions. As illustrated in FIG. 5B, at a first time instance, UL XR control and pose information in a $0^{th}$ time window (e.g., a number of milliseconds before the first time instance) may be transmitted in a packet 551 and UL XR control and pose information in a packet 552A. At a second time instance, UL XR control and pose information in the first time window (e.g., a number of milliseconds before the first time instance) may be transmitted in a repetition 552B of the packet 552A. At the second time instance, UL XR control and pose information in the second time window (e.g., a number of milliseconds before the second time instance) may also be transmitted in a packet 554A. At a third time instance, the UL XR control and pose information in the second time window (e.g., a number of milliseconds before the second time instance) may be transmitted in repetition 554B of the packet 554A and the UL XR control and pose information in a third time window (e.g., a number of milliseconds before the third time instance) may be transmitted in a packet 556A.

In other words, in each time instance, UL XR control and pose information in different time windows may be transmitted. UL XR control and pose information may be transmitted in more than one time instances as well. The time difference between the time instances may be based on the periodicity associated with the generation of the UL XR control and pose information.

With such a staggered repetition mechanism, the UL XR control and pose information may be transmitted with higher success rate and lower error rate because burst interference may have less impact on the transmission of the UL XR control and pose information. Moreover, such retransmissions may be robust against both stationary noise and burst noise. The UE UL active time (which may be the total time where the UE is performing UL transmission) may be the same as the UE performing repetitions based on the repetition in FIG. 5A. In some aspects, such a staggered transmission mechanism may be possible because periodicity of pose control information generation may be smaller than a packet delay budget (PDB) associated with the pose control information. Therefore, even with delayed repetition, the second repetition of the pose and control information may still be within the PDB.

Figure 6:
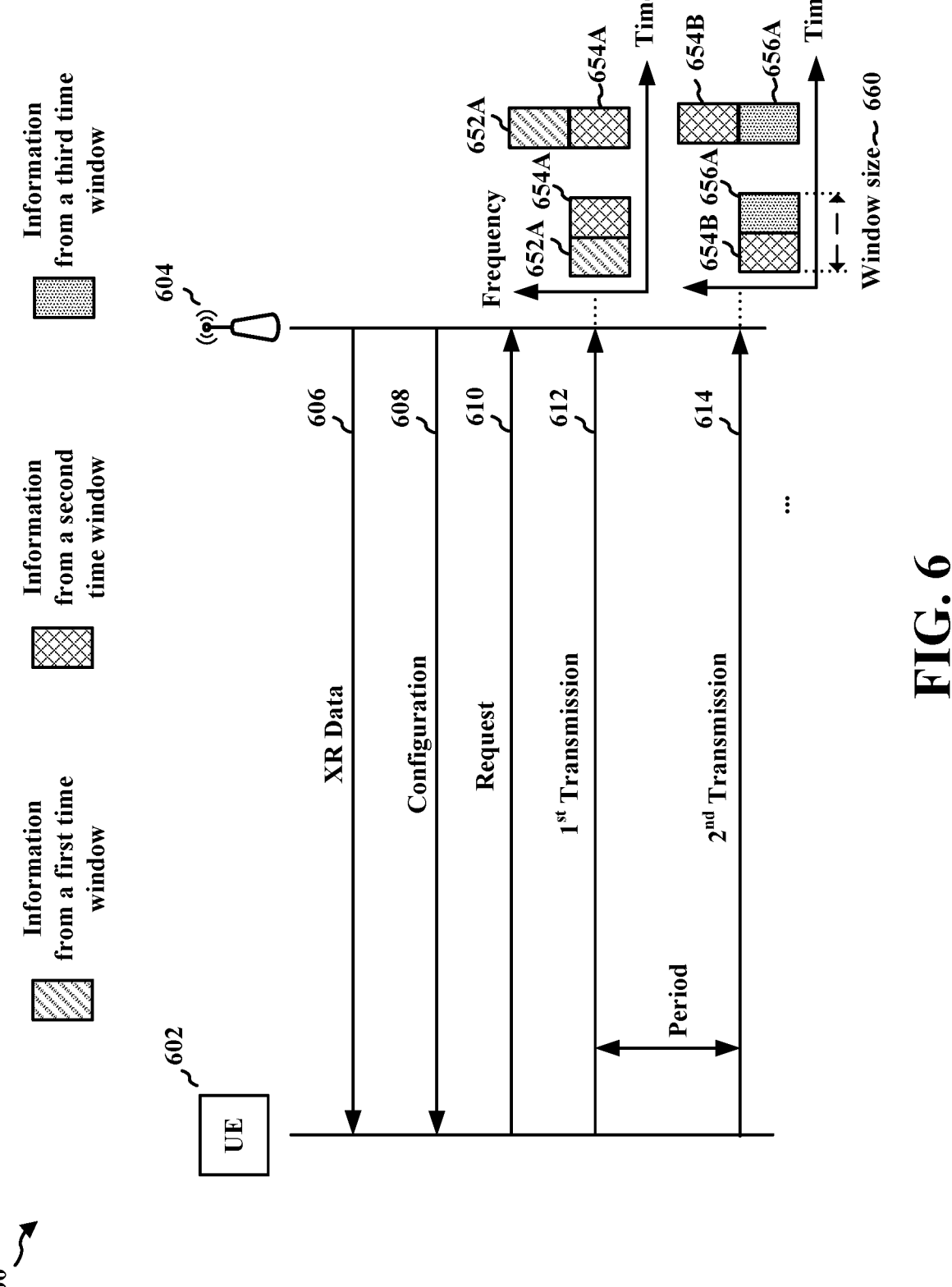
FIG. 6 is a diagram illustrating example communications between a network entity and a UE.

FIG. 6 is a diagram 600 illustrating example communications between a network entity 604 and a UE 602. In some aspects, the network entity 604 may be implemented as an aggregated base station, a disaggregated base station, an integrated access and backhaul (IAB) node, a relay node, a sidelink node, or the like. In some aspects, the network entity 804 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. As illustrated in FIG. 6, the network entity 604 may transmit XR data 606 for an XR application at the UE 602, such as audio/video data or other data, to the UE 602. In some aspects, the UE 602 may generate XR information, such as pose and control information. The XR information (e.g., the pose and control information) may be transmitted periodically in one or more transmission including the first transmission 612 and the second transmission 614.

In the first transmission 612, a packet 652A for XR information in a first time window may be included and a packet 654A for XR information in a second time window may be included. In some aspects, the packet 652A may be time division multiplexed (TDMed) with the packet 654A. In some aspects, the packet 652A may be included in a first UL OFDM symbol and the packet 654A may be included in a second UL OFDM symbol. The first UL OFDM symbol may be consecutive with (e.g., adjacent to) the second UL OFDM symbol. In some aspects, the packet 652A may be frequency division multiplexed (FDMed) with the packet 654A. In some aspects, the packet 652A may be included in at least a first RB in a UL OFDM symbol and the packet 654A may be included in at least a second RB in the same UL OFDM symbol.

In the second transmission 614, a packet 654B which may be a repetition of XR information in the second time window may be included. A packet 656A which may be carrying XR information in a third time window may also be included. In some aspects, the packet 656 A may be TDMed with the packet 654B. In some aspects, the packet 654B may be included in a first UL OFDM symbol and the packet 656A may be included in a second UL OFDM symbol. The first UL OFDM symbol may be consecutive with (e.g., adjacent to) the second UL OFDM symbol. In some aspects, the packet 656A may be FDMed with the packet 654B. In some aspects, the packet 654B may be included in at least a first RB in a UL OFDM symbol and the packet 656A may be included in at least a second RB in the same UL OFDM symbol.

In other words, in some aspects, repetition of first pose/control information in a first time window and initial transmission of second pose/control information in a second time window may be bundled together. The bundling may be in the time domain, e.g., in two consecutive UL OFDM symbols or in the frequency domain, e.g., in different RBs in the same UL OFDM symbol.

In some aspects, a transmission window size 660 associated with transmitting the packets in each transmission may be configured by the network entity 604 (e.g., in configuration 608). In some aspects, the network entity 604 may also configure the number of packets to be bundled and transmitted together for XR pose/control information (which may be equivalent to the transmission window size, either in time, e.g., 8 ms for the transmission of two packets in 4 ms periodicity, or in number of packets, e.g., 2 packets within the transmission window).

Because each transmission of the XR pose and control information may include information generated in two time windows (e.g., 2 time windows of 4 milliseconds each), the UE 602 and the network entity 604 may be both aware of such a transmission. In some aspects, such a repetition may be configured in the configuration 608 from the network entity 604 to the UE 602. The configuration 608 may also configure other XR transmission related parameters, such as packet size, periodicity, packet delay budget, packet success rate, or the like. In some aspects, such a repetition may be requested by the UE 602 in request 610. In some aspects, the request 610 may be transmitted in UE assistance information.

In some aspects, packets carrying XR information in different time windows in each transmission, such as the packet 652A and the packet 654A in the first transmission 612 and the packet 654B and the packet 656A in the second transmission 614, may be included in a same PUSCH transmission. The same PUSCH transmission may be transparent to a physical layer for encoding the two packets together. The same PUSCH transmission may be made within a same UL OFDM symbol.

In some aspects, packets carrying XR information in different time windows in each transmission, such as the packet 652A and the packet 654A in the first transmission 612 and the packet 654B and the packet 656A in the second transmission 614, may be include in separate PUSCH transmissions.

In some aspects, each packet in the transmissions, such as the packet 652A and the packet 654A in the first transmission 612 and the packet 654B and the packet 656A in the second transmission 614, may be associated with a same size. The transmissions may be associated with a same periodicity. In some aspects, the transmissions may be based on configured grant (CG) which may provide periodic resources with a fixed resource allocation (i.e., number of RBs, symbols, modulation and coding scheme (MCS), or the like). In some aspects, if CG is used for the transmission of the delayed repetition of pose and control information (such as the packet 652A and the packet 654A in the first transmission 612 and the packet 654B and the packet 656A in the second transmission 614), two CGs may be used to transmit the delayed repetition (e.g., packet 654B) and the initial transmission (e.g., packet 656A) of two packets. In some aspects, the two CGs may have the same periodicity, depending on whether the bundling is in the time domain or the frequency domain (TDM or FDM), the two CGs may respectively have the same RBs (for TDM) or non-overlapping RBs (for FDM). In some aspects, one CG may be used to transmit the delayed repetition (e.g., packet 654B) and initial transmission (e.g., packet 656A) of two packets. For example, if the two packets are transmitted in two PUSCH transmissions, the two PUSCH transmissions may be transmitted on a same CG occasion.

FIG. 7 is a flowchart 700 of a method of wireless communication. The method may be performed by a UE (e.g., the UE 104, the UE 602; the apparatus 904).

At 702, the UE may receive XR data associated with an XR application from a network entity. For example, the UE

602 may receive XR data 606 associated with an XR application from a network entity 604. In some aspects, 702 may be performed by XR component 198.

At 704, the UE may transmit, for the network entity at a first time, a first transmission including a first instance of XR information and a second instance of XR information. For example, the UE 602 may transmit, for the network entity 604 at a first time, a first transmission 612 including a first instance of XR information (e.g., 652A) and a second instance of XR information (e.g., 654A). In some aspects, 704 may be performed by XR component 198. In some aspects, the first transmission may include the first instance of XR information in at least a first uplink symbol and the second instance of XR information in at least a second uplink symbol based on time division multiplexing, and where the first uplink symbol may be adjacent to the second uplink symbol in a plurality of uplink symbols. In some aspects, the first transmission may include the first instance of XR information in at least a first RB in an uplink symbol and the second instance of XR information in at least a second RB in the uplink symbol based on frequency division multiplexing.

In some aspects, the UE may also receive a configuration for the first transmission and the second transmission from the network entity. For example, the UE 602 may receive a configuration for the first transmission and the second transmission from the network entity. The configuration may configure the staggered repetition mechanism for the UE 602. In some aspects, the configuration may include a number of instances of XR information or a transmit window size associated with each transmission of the first transmission or the second transmission. In some aspects, the configuration may also include the periodicity. In some aspects, the UE may transmit a request associated with a configuration of the first transmission and the second transmission for the network entity. For example, the UE 602 may transmit a request 610 associated with the first transmission and the second transmission for the network entity 604 (e.g., in UE assistance information).

At 706, the UE may transmit, for the network entity at a second time, a second transmission including the second instance of XR information and a third instance of XR information, where a time difference between the first time and the second time may be based on a periodicity associated with the XR information. For example, the UE 602 may transmit, for the network entity 604 at a second time, a second transmission 614 including the second instance of XR information (e.g., 654B) and a third instance of XR information (e.g., 656A), where a time difference between the first time and the second time may be based on a periodicity associated with the XR information. In some aspects, 706 may be performed by XR component 198. In some aspects, the first transmission may be included in a first physical uplink shared channel (PUSCH) transmission for the first instance of XR information and a second PUSCH transmission for the second instance of XR information and the second transmission may be included in a third PUSCH transmission for the second instance of XR information and a fourth PUSCH transmission for the second instance of XR information. In some aspects, the first transmission and the second transmission may be included in a same PUSCH transmission. In some aspects, the first transmission and the second transmission may be based on a single configured grant (CG) associated with the periodicity. In some aspects, the first transmission including the first instance of XR information and the second transmission including the second instance of the XR information may be based on a first configured grant (CG) and the first transmission including the second instance of XR information and the second transmission including the third instance of XR information are based on a second CG, and wherein the first CG and the second CG are associated with the periodicity. In some aspects, the first CG and the second CG may include a same set of RBs. In some aspects, the first CG may include a first set of RBs and the second CG may include a second set of RBs, the first set of RBs may be non-overlapping with the second set of RBs.

FIG. 8 is a flowchart 800 of a method of wireless communication. The method may be performed by a network entity (e.g., the base station 102, the network entity 604, the network entity 902, the network entity 1002).

At 802, the network entity may transmit XR data associated with an XR application for a UE. For example, the network entity 604 may transmit XR data 606 associated with an XR application for a UE 602. In some aspects, 802 may be performed by XR component 199.

At 804, the network entity may receive, at a first time, a first transmission including a first instance of XR information and a second instance of XR information. For example, the network entity 604 may receive, at a first time, a first transmission 612 including a first instance of XR information (e.g., 652A) and a second instance of XR information (e.g., 654A). In some aspects, 804 may be performed by XR component 199. In some aspects, the first transmission may include the first instance of XR information in at least a first uplink symbol and the second instance of XR information in at least a second uplink symbol based on time division multiplexing, and where the first uplink symbol may be adjacent to the second uplink symbol in a plurality of uplink symbols. In some aspects, the first transmission may include the first instance of XR information in at least a first RB in an uplink symbol and the second instance of XR information in at least a second RB in the uplink symbol based on frequency division multiplexing.

In some aspects, the network entity may also transmit a configuration for the first transmission and the second transmission for the UE. For example, the network entity 604 may transmit a configuration for the first transmission and the second transmission for the UE 602. The configuration may configure the staggered repetition mechanism for the UE 602. In some aspects, the configuration may include a number of instances of XR information or a transmit window size associated with each transmission of the first transmission or the second transmission. In some aspects, the configuration may also include the periodicity. In some aspects, the network entity may receive a request associated with a configuration of the first transmission and the second transmission. For example, the network entity 604 may receive a request 610 associated with the first transmission and the second transmission (e.g., in UE assistance information).

At 806, the network entity may receive, at a second time, a second transmission including the second instance of XR information and a third instance of XR information, where a time difference between the first time and the second time may be based on a periodicity associated with the XR information. For example, the network entity 604 may receive, at a second time, a second transmission 614 including the second instance of XR information (e.g., 654B) and a third instance of XR information (e.g., 656A), where a time difference between the first time and the second time may be based on a periodicity associated with the XR information. In some aspects, 806 may be performed by XR component 199. In some aspects, the first transmission may be included in a first physical uplink shared channel (PUSCH) transmission for the first instance of XR information and a second PUSCH transmission for the second instance of XR information and the second transmission may be included in a third PUSCH transmission for the second instance of XR information and a fourth PUSCH transmission for the second instance of XR information. In some aspects, the first transmission and the second transmission may be included in a same PUSCH transmission. In some aspects, the first transmission and the second transmission may be based on a single configured grant (CG) associated with the periodicity. In some aspects, the first transmission including the first instance of XR information and the second transmission including the second instance of the XR information are based on a first configured grant (CG) and the first transmission including the second instance of XR information and the second transmission including the third instance of XR information are based on a second CG, and wherein the first CG and the second CG are associated with the periodicity. In some aspects, the first CG and the second CG may include a same set of RBs. In some aspects, the first CG may include a first set of RBs and the second CG may include a second set of RBs, the first set of RBs may be non-overlapping with the second set of RBs.

Figure 9:
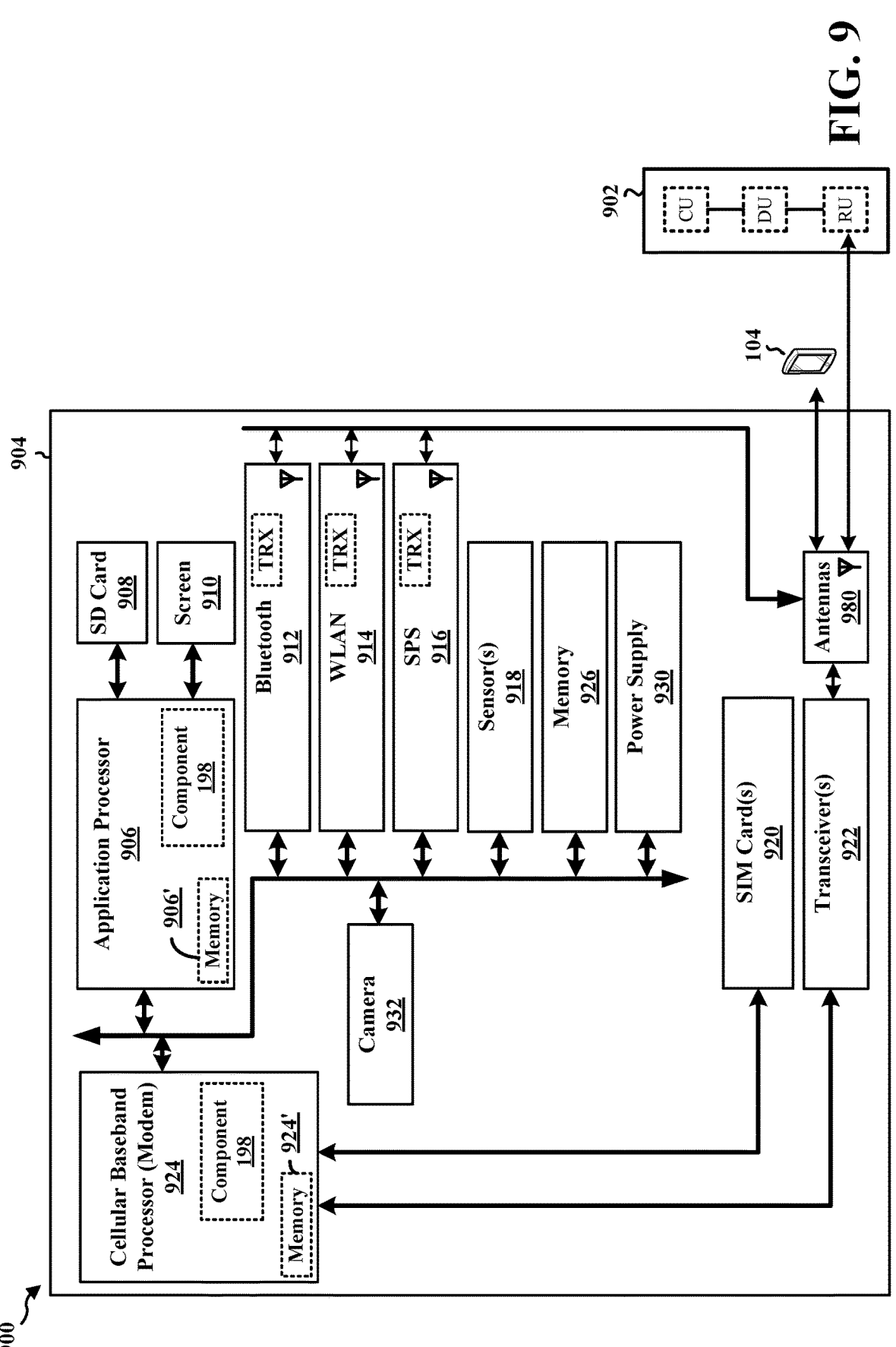
FIG. 9 is a diagram illustrating an example of a hardware implementation for an example apparatus and/or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, a satellite system module 916 (e.g., GNSS module), one or more sensor modules 918 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the satellite system module 916 may include an on-chip transceiver (TRX)/receiver (RX). The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924', 906', respectively. The additional memory modules 926 may also be considered a computer-readable medium/ memory. Each computer-readable medium/memory 924', 906', 926 may be non-transitory. The cellular baseband processor 924 and the application processor 906 are each responsible for general processing, including the execution of software stored on the computer-readable medium/ memory. The software, when executed by the cellular baseband processor 924/application processor 906, causes the cellular baseband processor 924/application processor 906 to perform the various functions described herein. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see 350 of FIG. 3) and include the additional modules of the apparatus 904.

As discussed herein, the XR component 198 may be configured to receive XR data associated with an XR application from a network entity. In some aspects, the XR component 198 may be further configured to transmit, for the network entity at a first time, a first transmission including a first instance of XR information and a second instance of XR information. In some aspects, the XR component 198 may be further configured to transmit, for the network entity at a second time, a second transmission including the second instance of XR information and a third instance of XR information, where a time difference between the first time and the second time may be based on a periodicity associated with the XR information. The XR component 198 may be within the cellular baseband processor 924, the application processor 906, or both the cellular baseband processor 924 and the application processor 906. The XR component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, includes means for receiving XR data associated with an XR application from a network entity. In some aspects, the apparatus 904 may further include means for transmitting, for the network entity at a first time, a first transmission including a first instance of XR information and a second instance of XR information. In some aspects, the apparatus 904 may further include means for transmitting, for the network entity at a second time, a second transmission including the second instance of XR information and a third instance of XR information, where a time difference between the first time and the second time may be based on a periodicity associated with the XR information. In some aspects, the apparatus 904 may further include means for receiving a configuration for the first transmission and the second transmission from the network entity. In some aspects, the apparatus 904 may further include means for transmitting a request associated with a configuration of the first transmission and the second transmission for the network entity. The means may be the XR component 198 of the apparatus 904 configured to perform the functions recited by the means. As described herein, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 10:
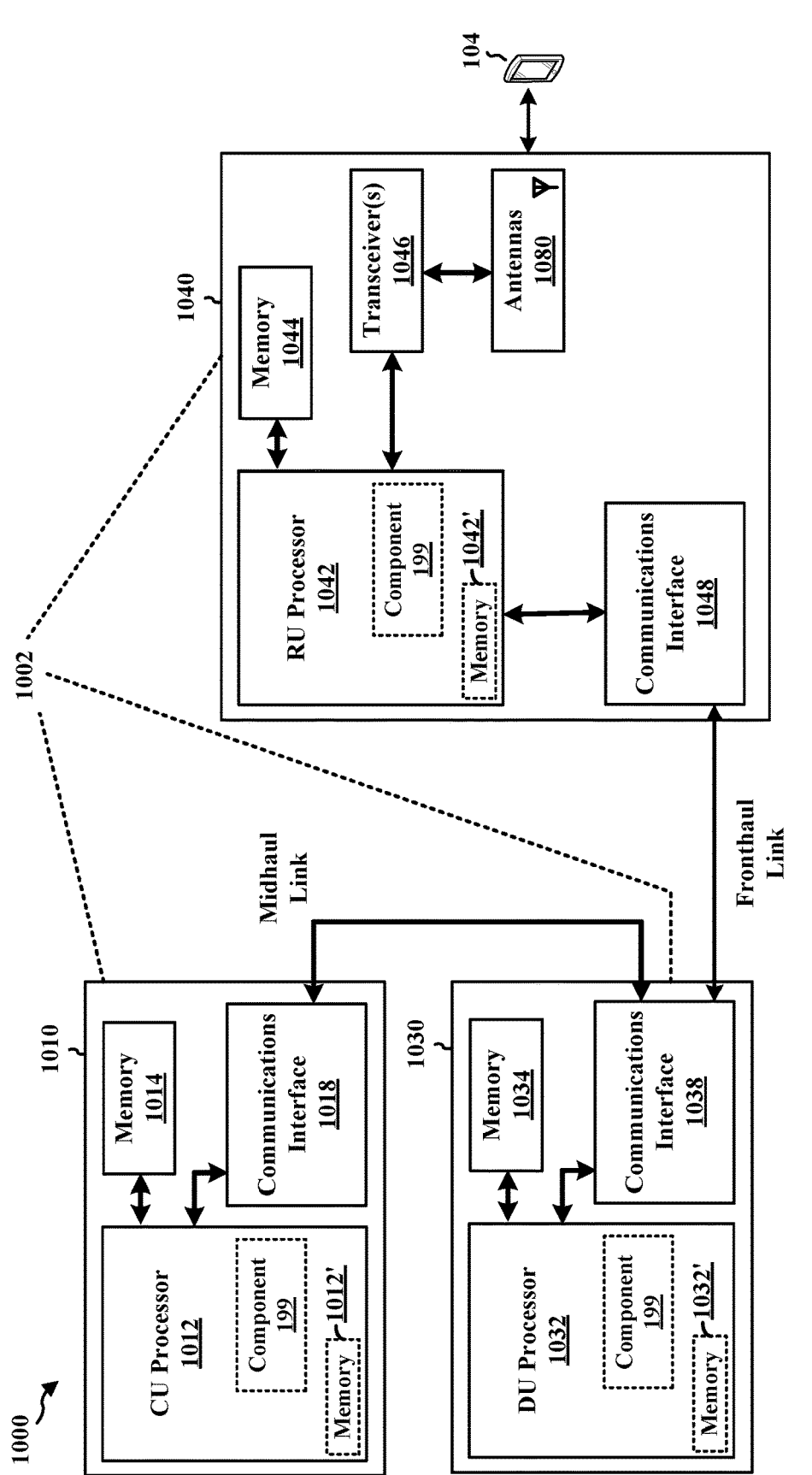
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the component 199, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include a CU processor 1012. The CU processor 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include a DU processor 1032. The DU processor 1032 may include on-chip memory 1032'. In some aspects, the DU 1030 may further include additional memory modules 1034 and a communications interface 1038. The DU 1030 communicates with the RU 1040 through a fronthaul link. The RU 1040 may include an RU processor 1042. The RU processor 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the XR component 199 may be configured to transmit XR data associated with an XR application for a UE. In some aspects, the XR component 199 may be further configured to receive, at a first time, a first transmission including a first instance of XR information and a second instance of XR information. In some aspects, the XR component 199 may be further configured to receive, at a second time, a second transmission including the second instance of XR information and a third instance of XR information, where a time difference between the first time and the second time may be based on a periodicity associated with the XR information. The XR component 199 may be within one or more processors of one or more of the CU 1010, DU 1030, and the RU 1040. The XR component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1002 may include a variety of components configured for various functions. In one configuration, the network entity 1002 includes means for transmitting XR data associated with an XR application for a UE. In some aspects, the network entity 1002 may further include means for receiving, at a first time, a first transmission including a first instance of XR information and a second instance of XR information. In some aspects, the network entity 1002 may further include means for receiving, at a second time, a second transmission including the second instance of XR information and a third instance of XR information, where a time difference between the first time and the second time may be based on a periodicity associated with the XR information. In some aspects, the network entity 1002 may further include means for transmitting a configuration for the first transmission and the second transmission for the UE. In some aspects, the network entity 1002 may further include means for receiving a request associated with a configuration of the first transmission and the second transmission. The means may be the XR component 199 of the network entity 1002 configured to perform the functions recited by the means. As described herein, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving extended reality (XR) data associated with an XR application from a network entity; transmitting, for the network entity at a first time, a first transmission including a first instance of XR information and a second instance of XR information; and transmitting, for the network entity at a second time, a second transmission including the second instance of XR information and a third instance of XR information, where a time difference between the first time and the second time is based on a periodicity associated with the XR information.

Aspect 2 is the method of aspect 1, where the first transmission includes the first instance of XR information in at least a first uplink symbol and the second instance of XR information in at least a second uplink symbol based on time division multiplexing (TDM), and where the first uplink symbol is adjacent to the second uplink symbol in a plurality of uplink symbols.

Aspect 3 is the method of any of aspects 1-2, where the first transmission includes the first instance of XR information in at least first resource block (RB) in an uplink symbol and the second instance of XR information in at least a second RB in the uplink symbol based on frequency division multiplexing (FDM).

Aspect 4 is the method of any of aspects 1-3, further including: receiving a configuration for the first transmission and the second transmission from the network entity.

Aspect 5 is the method of any of aspects 1-4, where the configuration includes a number of instances of XR information or a transmit window size associated with each transmission of the first transmission or the second transmission.

Aspect 6 is the method of any of aspects 1-5, further including: transmitting a request associated with a configuration of the first transmission and the second transmission to the network entity.

Aspect 7 is the method of any of aspects 1-6, where the first transmission is a first physical uplink shared channel (PUSCH) transmission and the second transmission is a second PUSCH transmission.

Aspect 8 is the method of any of aspects 1-7, where the first transmission and the second transmission is included in a first physical uplink shared channel (PUSCH) transmission and the second transmission is included in a second PUSCH.

Aspect 9 is the method of any of aspects 1-8, where the first transmission and the second transmission are based on a single configured grant (CG) associated with the periodicity.

Aspect 10 is the method of any of aspects 1-9, where the first transmission including the first instance of XR information and the second transmission including the second instance of the XR information are based on a first configured grant (CG) and the first transmission including the second instance of XR information and the second transmission including the third instance of XR information are based on a second CG, and wherein the first CG and the second CG are associated with the periodicity.

Aspect 11 is the method of any of aspects 1-10, where the first CG and the second CG include a same set of resource blocks (RBs).

Aspect 12 is the method of any of aspects 1-11, where the first CG includes a first set of resource blocks (RBs) and the second CG includes a second set of RBs, where the first set of RBs is non-overlapping with the second set of RBs.

Aspect 13 is the method of any of aspects 1-12, where the XR information includes control information and pose information.

Aspect 14 is a method of wireless communication at a network entity, including: transmitting extended reality (XR) data associated with an XR application for a user equipment (UE); receiving, at a first time, a first transmission including a first instance of XR information and a second instance of XR information; and receiving, at a second time, a second transmission including the second instance of XR information and a third instance of XR information, where a time difference between the first time and the second time is based on a periodicity associated with the XR information.

Aspect 15 is the method of aspect 14, where the first transmission includes the first instance of XR information in at least a first uplink symbol and the second instance of XR information in at least a second uplink symbol based on time division multiplexing (TDM), and where the first uplink symbol is adjacent to the second uplink symbol in a plurality of uplink symbols.

Aspect 16 is the method of any of aspects 14-15, where the first transmission includes the first instance of XR information in at least first resource block (RB) in an uplink symbol and the second instance of XR information in at least a second RB in the uplink symbol based on frequency division multiplexing (FDM).

Aspect 17 is the method of any of aspects 14-16, further including: transmitting a configuration for the first transmission and the second transmission for the UE.

Aspect 18 is the method of any of aspects 14-17, where the configuration includes a number of instances of XR information or a transmit window size associated with each transmission of the first transmission or the second transmission.

Aspect 19 is the method of any of aspects 14-18, further including: receiving a request associated with a configuration of the first transmission and the second transmission.

Aspect 20 is the method of any of aspects 14-19, where the first transmission is included in a first physical uplink shared channel (PUSCH) transmission for the first instance of XR information and a second PUSCH transmission for the second instance of XR information and the second transmission is included in a third PUSCH transmission for the second instance of XR information and a fourth PUSCH transmission for the second instance of XR information.

Aspect 21 is the method of any of aspects 14-20, where the first transmission and the second transmission is included in a first physical uplink shared channel (PUSCH) transmission and the second transmission is included in a second PUSCH.

Aspect 22 is the method of any of aspects 14-21, where the first transmission and the second transmission are based on a single configured grant (CG) associated with the periodicity.

Aspect 23 is the method of any of aspects 14-22, where the first transmission including the first instance of XR information and the second transmission including the second instance of the XR information are based on a first configured grant (CG) and the first transmission including the second instance of XR information and the second transmission including the third instance of XR information are based on a second CG, and wherein the first CG and the second CG are associated with the periodicity.

Aspect 24 is the method of any of aspects 14-23, where the first CG and the second CG include a same set of resource blocks (RBs).

Aspect 25 is the method of any of aspects 14-24, where the first CG includes a first set of resource blocks (RBs) and the second CG includes a second set of RBs, where the first set of RBs is non-overlapping with the second set of RBs.

Aspect 26 is the method of any of aspects 14-25, where the XR information includes control information and pose information.

Aspect 27 is an apparatus for wireless communication at a device including a memory and at least one processor coupled to the memory and, based at least in part on information stored in the memory, configured to perform a method in accordance with any of aspects 1-13. The apparatus may include at least one of a transceiver or an antenna coupled to the at least one processor.

Aspect 28 is an apparatus for wireless communication, including means for performing a method in accordance with any of aspects 1-13.

Aspect 29 is a non-transitory computer-readable medium including instructions that, when executed by an apparatus, cause the apparatus to perform a method in accordance with any of aspects 1-13.

Aspect 30 is an apparatus for wireless communication at a device including a memory and at least one processor coupled to the memory and, based at least in part on information stored in the memory, configured to perform a method in accordance with any of aspects 14-26. The apparatus may include at least one of a transceiver or an antenna coupled to the at least one processor.

Aspect 31 is an apparatus for wireless communication, including means for performing a method in accordance with any of aspects 14-26.

Aspect 32 is a non-transitory computer-readable medium including instructions that, when executed by an apparatus, cause the apparatus to perform a method in accordance with any of aspects 14-26.

What is claimed is:

1. An apparatus for wireless communication at a user equipment (UE), comprising:
memory; and
at least one processor coupled to the memory, wherein the at least one processor is configured to:

receive a configuration for repetition of extended reality (XR) information associated with an XR application from a network entity;

transmit, for the network entity at a first configured grant (CG) occasion, a first transmission including a first instance of XR information and a second instance of XR information, wherein the configuration further includes a packet delay budget for the XR information; and transmit, for the network entity at a second CG occasion that is separated in time from the first CG occasion by more than or equal to a periodicity, a second transmission including a third instance of XR information and a repetition of the second instance of XR information, wherein the periodicity is associated with the XR information, wherein the repetition of the second instance of XR information is transmitted in the second CG occasion that has the periodicity that is less than the packet delay budget for the XR information.

2. The apparatus of claim 1, wherein the first transmission includes the first instance of XR information in at least a first uplink symbol and the second instance of XR information in at least a second uplink symbol based on time division multiplexing (TDM), and wherein the first uplink symbol is adjacent to the second uplink symbol in a plurality of uplink symbols.

3. The apparatus of claim 1, wherein the first transmission includes the first instance of XR information in at least first resource block (RB) in an uplink symbol and the second instance of XR information in at least a second RB in the uplink symbol based on frequency division multiplexing (FDM).

4. The apparatus of claim 1, wherein the configuration comprises a number of instances of XR information or a transmit window size associated with each transmission of the first transmission or the second transmission.

5. The apparatus of claim 1, wherein the at least one processor is further configured to:

transmit a request for the repetition prior to reception of the configuration of the first transmission and the second transmission for the network entity.

6. The apparatus of claim 1, wherein the first transmission is included in a first physical uplink shared channel (PUSCH) transmission for the first instance of XR information and a second PUSCH transmission for the second instance of XR information and the second transmission is included in a third PUSCH transmission for the second instance of XR information and a fourth PUSCH transmission for the second instance of XR information.

7. The apparatus of claim 1, wherein the first transmission is included in a first physical uplink shared channel (PUSCH) transmission and the second transmission is included in a second PUSCH.

8. The apparatus of claim 1, wherein the first transmission and the second transmission are in different time windows based on a single configured grant (CG) associated with the periodicity.

9. The apparatus of claim 1, wherein the first transmission including the first instance of XR information and the second transmission including the second instance of the XR information are based on a first CG and the first transmission including the second instance of XR information and the second transmission including the third instance of XR information are based on a second CG, and wherein the first CG and the second CG are associated with the periodicity.

10. The apparatus of claim 9, wherein the first CG and the second CG comprise a same set of resource blocks (RBs).

11. The apparatus of claim 9, wherein the first CG comprises a first set of resource blocks (RBs) and the second CG comprises a second set of RBs, wherein the first set of RBs is non-overlapping with the second set of RBs.

12. The apparatus of claim 1, wherein the XR information comprises control information and pose information.

13. The apparatus of claim 1, further comprising a transceiver or an antenna coupled to the at least one processor, and wherein the transceiver or the antenna is configured to receive the configuration and transmit the first transmission and the second transmission.

14. The apparatus of claim 1, wherein the configuration is for the repetition of XR control information or XR pose information, wherein the first instance of XR information includes a first instance of the XR control information or the XR pose information, wherein the second instance of XR information includes a second instance of the XR control information or the XR pose information and wherein the third instance of XR information includes a third instance of the XR control information or the XR pose information.

15. The apparatus of claim 1, wherein the configuration indicates the repetition of XR control information, and wherein the XR control information has the packet delay budget that is larger than the periodicity.

16. The apparatus of claim 1, wherein the configuration indicates the repetition of XR pose information, and wherein the XR pose information has the packet delay budget that is larger than the periodicity.

17. An apparatus for wireless communication at a network entity, comprising:

memory; and at least one processor coupled to the memory, wherein the at least one processor is configured to:

transmit a configuration for repetition of extended reality (XR) information associated with an XR application for a user equipment (UE), wherein the configuration further includes a packet delay budget for the XR information;

receive, at a first configured grant (CG) occasion, a first transmission including a first instance of XR information and a second instance of XR information; and receive, at a second a second CG occasion that is separated in time from the first CG occasion by more than or equal to periodicity, a second transmission including a third instance of XR information and a repetition of the second instance of XR information, wherein the periodicity is associated with the XR information, wherein the repetition of the second instance of XR information is transmitted in the second CG occasion that has the periodicity that is less than the packet delay budget for the XR information.

18. The apparatus of claim 17, wherein the first transmission includes the first instance of XR information in at least a first uplink symbol and the second instance of XR information in at least a second uplink symbol based on time division multiplexing (TDM), and wherein the first uplink symbol is adjacent to the second uplink symbol in a plurality of uplink symbols.

19. The apparatus of claim 17, wherein the first transmission includes the first instance of XR information in at least first resource block (RB) in an uplink symbol and the second instance of XR information in at least a second RB in the uplink symbol based on frequency division multiplexing (FDM).

20. The apparatus of claim 17, wherein the configuration comprises a number of instances of XR information or a transmit window size associated with each transmission of the first transmission or the second transmission.

21. The apparatus of claim 17, wherein the at least one processor is further configured to:

receive a request for the repetition prior to transmission of the configuration of the first transmission and the second transmission.

22. The apparatus of claim 17, wherein the first transmission is included in a first physical uplink shared channel (PUSCH) transmission for the first instance of XR information and a second PUSCH transmission for the second instance of XR information and the second transmission is included in a third PUSCH transmission for the second instance of XR information and a fourth PUSCH transmission for the second instance of XR information.

23. The apparatus of claim 17, wherein the first transmission and the second transmission is included in a first physical uplink shared channel (PUSCH) transmission and the second transmission is included in a second PUSCH.

24. The apparatus of claim 17, wherein the first transmission and the second transmission are in different time windows based on a single CG associated with the periodicity.

25. The apparatus of claim 17, wherein the first transmission including the first instance of XR information and the second transmission including the second instance of the XR information are based on a first CG and the first transmission including the second instance of XR information and the second transmission including the third instance of XR information are based on a second CG, and wherein the first CG and the second CG are associated with the periodicity.

26. The apparatus of claim 25, wherein the first CG and the second CG comprise a same set of resource blocks (RBs).

27. The apparatus of claim 25, wherein the first CG comprises a first set of resource blocks (RBs) and the second CG comprises a second set of RBs, wherein the first set of RBs is non-overlapping with the second set of RBs.

28. The apparatus of claim 17, wherein the XR information comprises control information and pose information.

29. The apparatus of claim 17, further comprising a transceiver or an antenna coupled to the at least one processor, and wherein the transceiver or the antenna is configured to transmit the configuration and receive the first transmission and the second transmission.

30. A method of wireless communication at a user equipment (UE), comprising:

receiving a configuration for repetition of extended reality (XR) information associated with an XR application from a network entity, wherein the configuration further includes a packet delay budget for the XR information;

transmitting, for the network entity at a first configured grant (CG) occasion, a first transmission including a first instance of XR information and a second instance of XR information; and transmitting, for the network entity at a second CG occasion that is separated in time from the first CG occasion by more than or equal to a periodicity, a second transmission including a third instance of XR information and a repetition of the second instance of XR information, wherein the periodicity is associated with the XR information, wherein the repetition of the second instance of XR information is transmitted in the second CG occasion that has the periodicity that is less than the packet delay budget for the XR information.

31. The method of claim 30, wherein the first transmission including the first instance of XR information and the second transmission including the second instance of the XR information are based on a first CG and the first transmission including the second instance of XR information and the second transmission including the third instance of XR information are based on a second CG, and wherein the first CG and the second CG are associated with the periodicity.

32. A method of wireless communication at a network entity, comprising:

transmitting a configuration for repetition of extended reality (XR) information associated with an XR application from the network entity, wherein the configuration further includes a packet delay budget for the XR information;

receiving, at a first configured grant (CG) occasion, a first transmission including a first instance of XR information and a second instance of XR information; and receiving, at a second CG occasion that is separated in time from the first CG occasion by more than or equal to a periodicity, a second transmission including a third instance of XR information and a repetition of the second instance of XR information, wherein the periodicity is associated with the XR information, wherein the repetition of the second instance of XR information is transmitted in the second CG occasion that has the periodicity that is less than the packet delay budget for the XR information.

\* \* \* \* \*